US012737593B2

(12) United States Patent
Zhang et al.

(10) Patent No.: US 12,737,593 B2
(45) Date of Patent: Sep. 15, 2026

(54) SYSTEMS AND METHODS PROVIDING A CONJOINTNET ARCHITECTURE FOR ENHANCED CONJOINT ANALYSIS FOR PREFERENCE PREDICTION WITH REPRESENTATION LEARNING

(71) Applicant: Toyota Research Institute, Inc., Los Altos, CA (US)

(72) Inventors: Yanxia Zhang, Foster City, CA (US); Francine R. Chen, Menlo Park, CA (US); Rumen Iliev, Millbrae, CA (US); Totte Harinen, San Francisco, CA (US); Alexandre L.S. Filipowicz, Mountain View, CA (US); Yin-Ying Chen, San Jose, CA (US); Nikos Arechiga Gonzalez, San Mateo, CA (US); Shabnam Hakimi, Chapel Hill, NC (US); Kenton Michael Lyons, Los Altos, CA (US); Charlene C. Wu, San Francisco, CA (US); Matthew E. Klenk, San Francisco, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 786 days.

(21) Appl. No.: 18/113,937

(22) Filed: Feb. 24, 2023

(65) Prior Publication Data

US 2023/0409880 A1 Dec. 21, 2023

Related U.S. Application Data

(60) Provisional application No. 63/352,824, filed on Jun. 16, 2022.

(51) Int. Cl.
*G06N 3/0455* (2023.01)
*G06N 3/048* (2023.01)

(52) U.S. Cl.
CPC .......... *G06N 3/0455* (2023.01); *G06N 3/048* (2023.01)

(58) Field of Classification Search
CPC .... G06N 3/0455; G06N 3/048; G06N 3/0464; G06N 3/0895
See application file for complete search history.

(56) References Cited

U.S. PATENT DOCUMENTS

| | | | |
|---|---|---|---|
| 11,127,488 | B1 | 9/2021 | Bajpai et al. |
| 2009/0292588 | A1 | 11/2009 | Duzevik et al. |

(Continued)

FOREIGN PATENT DOCUMENTS

| | | | |
|---|---|---|---|
| CN | 108920641 | B | 5/2021 |
| CN | 113806630 | A | 12/2021 |

OTHER PUBLICATIONS

Han K, Wang Y, Zhang C, Li C, Xu C. Autoencoder inspired unsupervised feature selection. In2018 IEEE international conference on acoustics, speech and signal processing (ICASSP) Apr. 15, 2018 (pp. 2941-2945). IEEE. (Year: 2018).*

(Continued)

*Primary Examiner* — Oluwatosin Alabi
(74) *Attorney, Agent, or Firm* — Dinsmore & Shohl LLP

(57) ABSTRACT

Systems and methods for generating predicted preferences are disclosed. The method includes implementing, with a computing device having a processor and a non-transitory computer-readable memory, a conjoint architecture comprising: an autoencoder trained to transform input data including one or more choices and one or more features into a latent representation, and a choice classification network trained to predict one or more predicted preferences from the latent representation extracted by the autoencoder. The method further includes outputting, from the choice classification network, the one or more predicted preferences.

20 Claims, 10 Drawing Sheets

(56) References Cited

U.S. PATENT DOCUMENTS

| | | | | |
|---|---|---|---|---|
| 2020/0065616 | A1* | 2/2020 | Xu | G06F 18/23213 |
| 2022/0058489 | A1* | 2/2022 | Volkovs | G06N 3/0499 |
| 2022/0222688 | A1* | 7/2022 | Wang | G06Q 30/0201 |
| 2023/0134392 | A1* | 5/2023 | D'Alessandro | G06Q 20/22 705/39 |
| 2024/0104350 | A1* | 3/2024 | Bachrach | G06N 3/094 |
| 2024/0212845 | A1* | 6/2024 | Khare | A61B 5/7282 |

OTHER PUBLICATIONS

Khare N, Thakur PS, Khanna P, Ojha A. Analysis of loss functions for image reconstruction using convolutional autoencoder. InInternational Conference on Computer Vision and Image Processing Dec. 3, 2021 (pp. 338-349). Cham: Springer International Publishing. (Year: 2021).*

Yanxin Pan; Preference modeling in data-driven product design: application in visual aesthetics (https://deepblue.lib.umich.edu/bitstream/handle/2027.42/145987/yanxinp_1.pdf?sequence=1), 154 pgs.; 2018.

Juan Ni et al.; An effective recommendation model based on deep representation learning (https://www.sciencedirect.com/science/article/abs/pii/S0020025520307015); 9 pgs.; Jan. 4, 2021.

* cited by examiner

SYSTEMS AND METHODS PROVIDING A CONJOINTNET ARCHITECTURE FOR ENHANCED CONJOINT ANALYSIS FOR PREFERENCE PREDICTION WITH REPRESENTATION LEARNING

CROSS-REFERENCE TO RELATED APPLICATION

This application claims priority to U.S. Provisional Application No. 63/352,824 filed Jun. 16, 2022, the disclosure of which is incorporated herein by reference in its entirety.

TECHNICAL FIELD

The present disclosure relates to systems, methods, and computer implemented programs for analyzing consumer choices and predict consumer preferences and market response to products and, more specifically, to systems, methods, and computer implemented programs that utilize profiles to predict choices among competing products and suppliers when the products have multiple features at different levels.

BACKGROUND

Knowledge of consumer preferences is central not only to designing product features but also to predicting market response to new products or services. Conjoint analysis is frequently used to model consumers' choices, thereby gaining insight into their preferences for specific products or product attributes. Conjoint analysis helps businesses identify the best attributes to include in a product. Choice-based (or discrete choice) conjoint analysis is perhaps the most common conjoint analysis approach, leveraging consumers' actual choices rather than more abstract ratings or rankings to infer preference over various product attributes. Respondents make choices over many combinations of product attributes, signaling their preference through their behavior. However, implementations of conjoint analysis rely on Support Vector Machine and Hierarchical Bayesian Modeling based on choice-based conjoint surveys thereby requiring feature engineering for implementation which inhibits scalability with respect to large numbers of input features.

Accordingly, there is a need for systems and methods that improve the efficiency of processing survey data with an end-to-end training system and eliminate the need for feature engineering such that the systems and methods scale up easily on a large number of input features. a conjoint architecture that requires fewer observations and

SUMMARY

In one embodiment, a method for generating predicted preferences is provided. The method includes implementing, with a computing device having a processor and a non-transitory computer-readable memory, a conjoint architecture comprising: an autoencoder trained to transform input data including one or more choices and one or more features into a latent representation, and a choice classification network trained to predict one or more predicted preferences from the latent representation extracted by the autoencoder. The method further includes outputting, from the choice classification network, the one or more predicted preferences.

In another embodiment, a system for generating predicted preferences, the system includes one or more processors; and a non-transitory, computer-readable medium storing instructions. When the non-transitory, computer-readable medium storing instructions are executed by the one or more processors, the one or more processors implement a conjoint architecture including an autoencoder trained to transform input data including one or more choices and one or more features into a latent representation, and a choice classification network trained to predict one or more predicted preferences from the latent representation extracted by the autoencoder; and output, from the choice classification network, the one or more predicted preferences.

In another embodiment, a computing program product for generating predicted preferences is provided. The computing program product comprising machine-readable instructions stored on a non-transitory computer readable memory, which when executed by a computing device, causes the computing device to carry out steps comprising implementing a conjoint architecture comprising: an autoencoder trained to transform input data including one or more choices and one or more features into a latent representation, and a choice classification network trained to predict one or more predicted preferences from the latent representation extracted by the autoencoder; and outputting, from the choice classification network, the one or more predicted preferences.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and are not intended to limit the disclosure. The following detailed description of the illustrative embodiments can be understood when read in conjunction with the following drawings, where like structure is indicated with like reference numerals.

DETAILED DESCRIPTION

Figure 1:
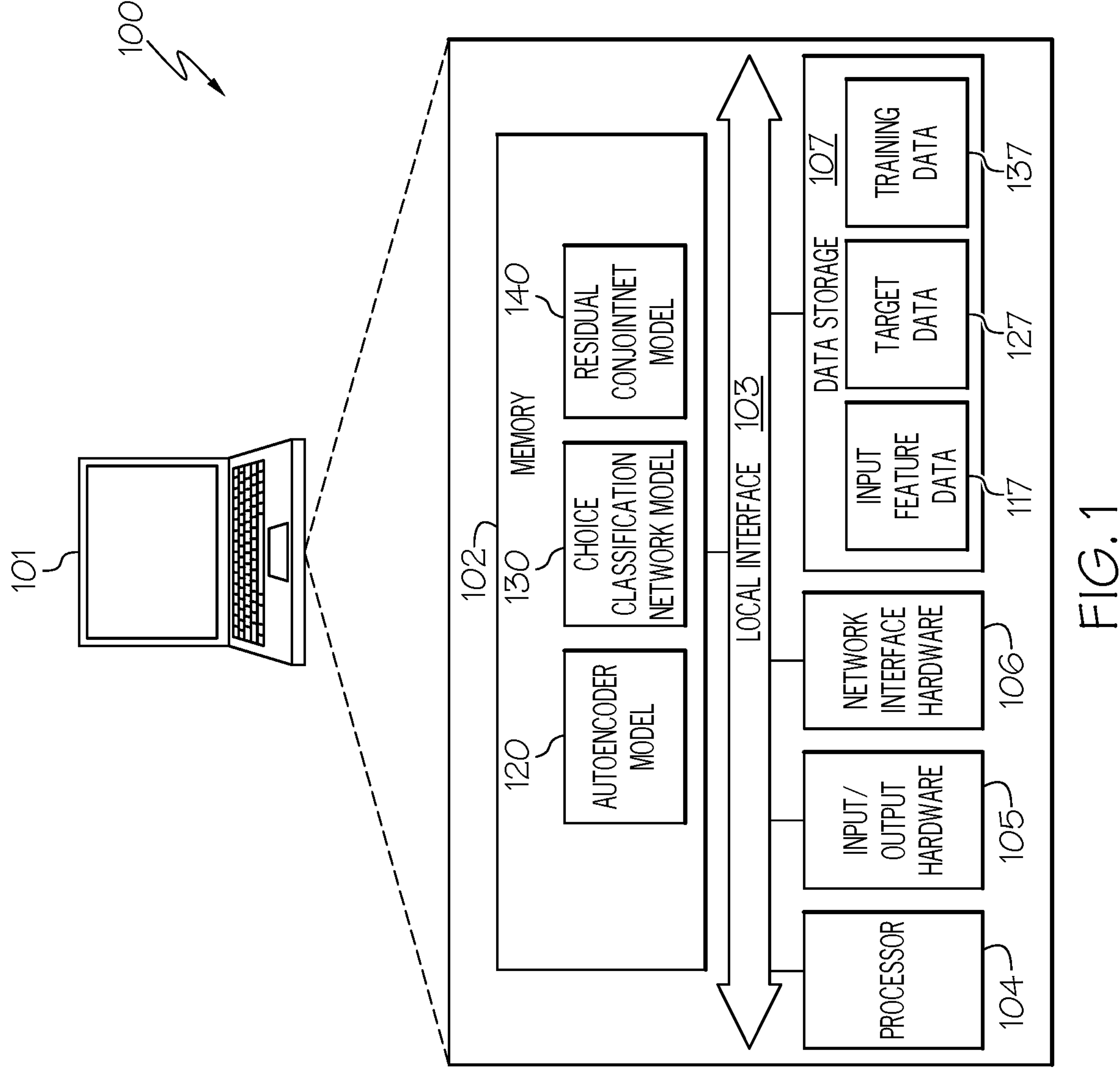
FIG. 1 schematically depicts an illustrative prediction system implemented by a computing device, according to one or more embodiments shown and described herein.

Embodiments of the present disclosure are directed to conjoint estimation techniques that utilize representation learning to alleviate issues associated with limited predictability and inaccurate estimations of product attribute contributions produced by simple linear models. The ConjointNet architecture described in the present disclosure is composed of two novel neural architectures trained to predict user preferences.

Embodiments described herein improve the efficiency of processing survey data with an end-to-end training system. In this way, feature learning and prediction are optimized simultaneously. Unlike prior works that applied Support Vector Machine and Hierarchical Bayesian Modeling on choice-based conjoint surveys, the present approach eliminates the need for feature engineering and is therefore able to scale up easily on a large number of input features. For example, the Moral Machine dataset has an input size of over 20 attributes with as many as 5 levels per attribute.

Embodiments of the ConjointNet described herein employ two novel architectures that are designed to effectively predict user preferences over unseen data in addition to partworth estimation. The semi-supervised ConjointNet employs autoencoders to pretrain on raw inputs. This provides the benefit of leveraging a large amount of unlabeled data, and therefore requires fewer observations per respondent. The residual ConjointNet uses a ResNet-inspired architecture to simultaneously learn the linear and nonlinear components.

Although linear regressions for conjoint analysis are successful when all input features are independent, this is very difficult to achieve in real-world datasets. Certain features are inherently correlated, for instance, "engine capacity and fuel" consumed in cars. Another way to overcome the limitation of linear assumption is to use data collected from a completely randomized design experiment. However, this is often not the case in real-world observational data. Instead of relying on the assumption that attributes are independent, embodiments of the ConjointNet described herein allows approximation with non-linear neural networks and thus can model non-linear feature interactions.

As described in more detail herein, embodiments of ConjointNet enhance conjoint analysis by discovering non-linear interactions from data. This complements existing workflow that requires a domain expert to design new interaction features. The results demonstrate significant improvement in predictive performance over traditional conjoint analysis on at least two public datasets. Additionally, ConjointNet enables end-to-end learning and works with raw choice-based conjoint survey data without hand-crafted features. This provides the flexibility of working with different target responses from the same set of survey input. The resulting representations can be easily concatenated with other modalities such as images or personal embeddings. As previously mentioned and will be described in more detail herein, ConjointNet employs two novel architectures that are designed to effectively predict user preferences over unseen data in addition to partworth estimation. The semi-supervised ConjointNet employs autoencoders to pretrain on raw inputs. This provides the benefit of leveraging a large amount of unlabeled data, and therefore requires fewer observations per respondent. The residual ConjointNet uses a ResNet-inspired architecture to simultaneously learn the linear and nonlinear components.

In operation, the systems or methods employing the ConjointNet architecture analyze consumer purchase choices based on features of the products and predict consumer purchase choices for new products based on the trained neural network models implemented by the ConjointNet architecture. The embodiments described herein provide systems and methods for efficiently and accurately predict consumer purchase habits. The disclosed method overcomes the limitations of linear assumption in traditional conjoint analysis and provides more realistic guidance for the product manufacturers and the end user. For example, in the versions of the conjoint analysis method, n represents the consumers that are asked to choose between multiple options in a number of trials. The responses are training samples (x, y) where x represents the item and y is the target. Each item is described by m attributes with a total $k_i$ levels for each attribute i=1, m. In choice-based surveys, the target y is the observed choice variable (ground truth label) and is equal to one if the choice item is selected and zero otherwise. User preferences are modeled as a utility function U(x) which represents how much users value the product. For example, as described in more detail herein the ConjointNet architecture generates a predicted utility score that represents a predicted value of a product defined by input data such as a combination of choices.

Thus, choice-based conjoint analysis is essentially a linear model that assumes the utilities of an item U(x)=wx are the sum of the partworth values of all attributes defined as:

$$U(x)=\sum_{i=1}^{m}\sum_{j=1}^{k_i} w_{ij}x_{ij} \quad \text{EQ. 1}$$

where the partworth value $w_{ij}$ represents the utility of the $i^{th}$ attribute at level j.

Users' preferences are ranked over each attribute at different levels using the partworth value $w_{ij}$. Additionally, the importance of each attribute is determined by either summing up the partworths at all levels or defined as ui=max $(w_{ij})$–min $(w_{ij})$. Finally, an option is selected by using attribute levels with maximum partworth sums.

However, although linear regressions for conjoint analysis as shown in Equation 1 can be successful when all input features are independent, this is hard to get in real-world datasets. That is, certain features are inherently correlated, for instance, "engine capacity and fuel" consumed in cars. Another way to overcome the limitation of linear assumption is to use data collected from a completely randomized design experiment. However, this is often not the case in real-world observational data. Instead of relying on the assumption that attributes are independent, embodiments of the ConjointNet described herein allow for approximation with non-linear neural networks and thus can model non-linear feature interactions.

The following will now describe these systems and methods in more detail with reference to the drawings and where like numbers refer to like structures.

Referring to FIG. 1, an illustrative prediction system implemented by a computing device 101. Embodiments of the system 100 for generating predicted consumer choices using a ConjointNet architecture, which will be described in more detail herein, includes an autoencoder model 120, a choice classification network model 130, and a residual ConjointNet model 140. The system 100 depicted in FIG. 1 includes a computing device 101. The computing device 101 may further comprise various components, such as a memory 102, a processor 104, input/output hardware 105, network interface hardware 106, a data storage 107, and a local interface 103.

The computing device 101 may be any device or combination of components comprising a processor 104 and a memory 102, such as a non-transitory computer readable memory. The processor 104 may be any device capable of executing the machine-readable instruction set stored in the non-transitory computer readable memory. Accordingly, the processor 104 may be an electric controller, an integrated circuit, a microchip, a computer, or any other computing device. The processor 104 may include any processing component(s) configured to receive and execute programming instructions (such as from the data storage component 107 and/or the memory component 102). The instructions may be in the form of a machine-readable instruction set stored in the data storage component 107 and/or the memory component 102. The processor 104 is communicatively coupled to the other components of the computing device 101 by the local interface 103. Accordingly, the local interface 103 may communicatively couple any number of processors 104 with one another, and allow the components coupled to the local interface 103 to operate in a distributed computing environment. Specifically, each of the components may operate as a node that may send and/or receive data. While the embodiment depicted in FIG. 1 includes a single processor 104, other embodiments may include more than one processor 104.

The memory 102 (e.g., a non-transitory computer readable memory component) may comprise RAM, ROM, flash memories, hard drives, or any non-transitory memory device capable of storing machine-readable instructions such that the machine-readable instructions can be accessed and executed by the processor 104. The machine-readable instruction set may comprise logic or algorithm(s) written in any programming language of any generation (e.g., 1GL, 2GL, 3GL, 4GL, or 5GL) such as, for example, machine language that may be directly executed by the processor 104, or assembly language, object-oriented programming (OOP), scripting languages, microcode, etc., that may be compiled or assembled into machine readable instructions and stored in the memory 102. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer readable memory 102, other embodiments may include more than one memory module.

The input/output hardware 105 may include a monitor, keyboard, mouse, printer, camera, microphone, speaker, and/or other device for receiving, sending, and/or presenting data. The network interface hardware 106 may include any wired or wireless networking hardware, such as a modem, LAN port, Wi-Fi card, WiMax card, mobile communications hardware, and/or other hardware for communicating with other networks and/or devices.

The data storage component 107 stores input feature data 117, target data 127, and training data 137. The input feature data 117 includes information about features and their possible configurations at different level of interested products. For example, car options might be a combination of features (e.g., brand, size, color, powertrain, trim, price, price range or the like), which are available in different levels (e.g., the size may be 2-door or 4-door). Target data 127 are expected variables in associated with the features. When a target value of choice item A is greater than that of choice item B, it indicates a choice item A has a greater chance to be chosen by a consumer over choice item B. In embodiments, a target (y) is an observed choice variable (ground truth label) and is equal to one if the choice item is selected and zero if the otherwise. The target values may change during the training process, which will be described in further detail below. The training data 137 is data including known consumer choices associated with a type of product's features. The training data 137 may be searchable based on choices, products, and features.

Additionally, the memory 102 may store historical data generated in the autoencoder model 120, choice classification network model 130, and residual ConjointNet model 140, such as the neural network models therein.

Figure 2:
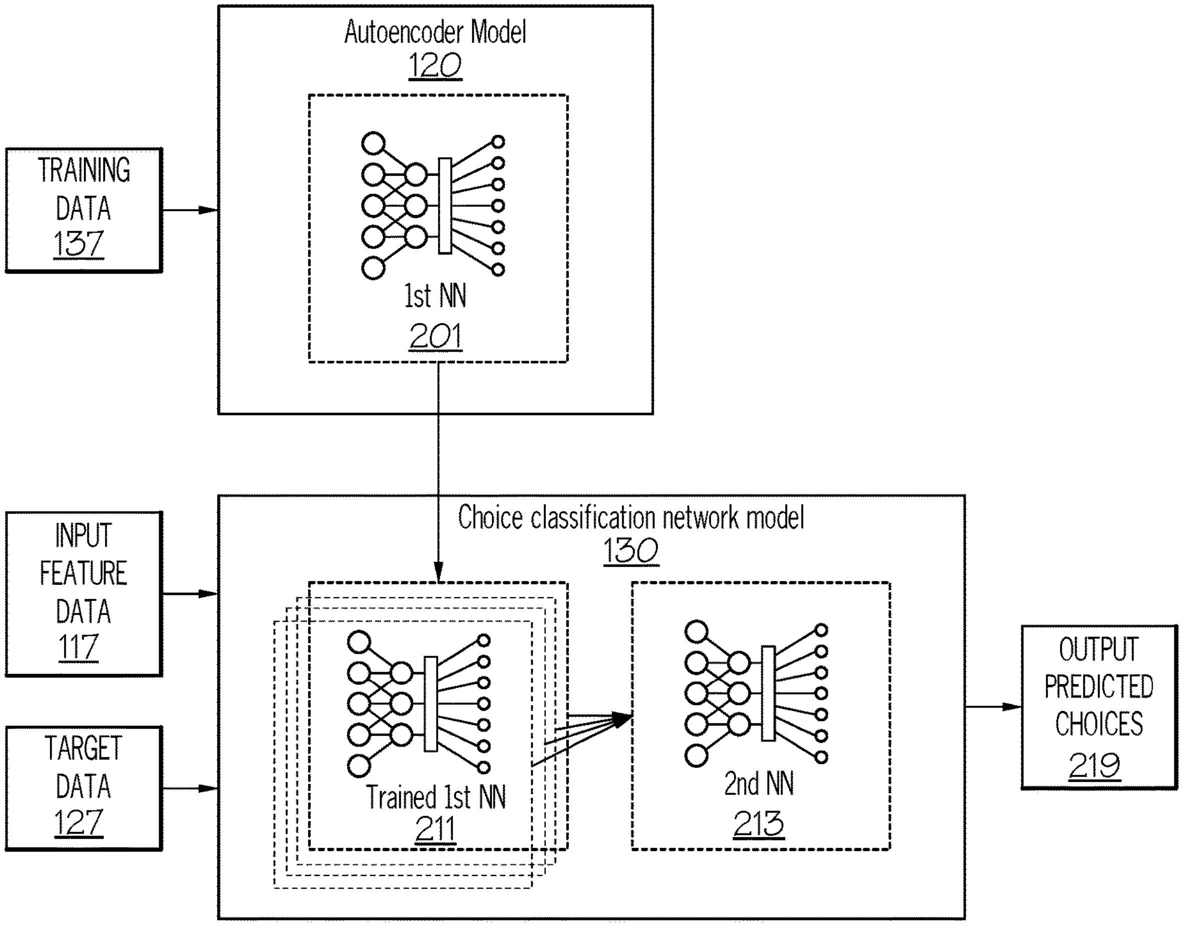
FIG. 2 schematically depicts an illustrative block diagram of the ConjointNet architecture, according to one or more embodiments shown and described herein.

The memory component 102 may include an autoencoder model 120, a choice classification network model 130, and a residual ConjointNet model 140. The autoencoder model 120 includes a first neural network ($1^{st}$ NN) 201 (FIG. 2). The classification network model 130 includes trained first neural network (trained $1^{st}$ NN) 211 and a second neural network ($2^{nd}$ NN) 213. The residual ConjointNet model 140 may comprise a linear utility neural network and a nonlinear utility neural network. The memory component 102 may be a machine-readable memory (which may also be referred to as a non-transitory processor readable memory or medium) that stores instructions which, when executed by the processor 104, causes the processor 104 to perform a method or control scheme as described herein. The memory component 102 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components.

It should be understood that the data storage component 107 may reside local to and/or remote from the computing device 101 and may be configured to store one or more pieces of data for access by the computing device 101 and/or other components.

The autoencoder model 120, choice classification network model 130, and residual ConjointNet model 140 may be trained and provided machine learning capabilities via a neural network as described herein. By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. The one or more ANN models may employ a combination of artificial intelligence techniques, such as, but not limited to, Deep Learning, Random Forest Classifiers, Feature extraction from audio, images, clustering algorithms, or combinations thereof.

In some embodiments, a convolutional neural network (CNN) may be utilized. For example, a convolutional neural network (CNN) may be used as an ANN that, in a field of machine learning, for example, is a class of deep, feed-forward ANNs applied for audio-visual analysis of the captured disturbances. CNNs may be shift or space invariant and utilize shared-weight architecture and translation Referring to FIG. 2, a block diagram representing the ConjointNet architect implemented by the system 100 disclosed herein. The design of the ConjointNet architecture is based on semi-supervised learning. The network makes use of both labelled and unlabeled data samples. FIG. 2 shows the architecture that employs an autoencoder model 120 to transform the input choice data into a latent representation, and a choice classification network 130 (also referred to herein as a choice classification network model) that makes predictions from learned representations extracted by the autoencoder.

The block diagram depicts the interconnection of input data and models. In embodiments, the autoencoder model 120 is initiated by the computing device 101. The autoencoder model 120 may comprise a $1^{st}$ NN 201. When the autoencoder model 120 receives training data 137 and is executed by the computing device 101, the $1^{st}$ NN 201 of the autoencoder model 120 is trained. The training data 137 may comprise input features of one or more products, targets associated with the input features, choices made by numerous users and consumers. The input features may have more than one subset and possible configuration.

An autoencoder is a building block for deep learning as a feature learning technique that maps raw inputs into a latent space. It converts an unsupervised problem to a supervised problem by reconstructing the original inputs with a loss function. An autoencoder that comprises three hidden layers of neurons for both the encoder and decoder may be implemented. The autoencoder is symmetric with the size of the input layers matching that of the output layer. The latent representation is one bottleneck layer in the middle. Given the input items $X=x_{ij}$, where $i\in[1,m]$, $j\in[1,k]$ the optimization function of the autoencoder is defined as:

$$L_{recon} = \min \sum\nolimits_{i=1}^{m} \sum\nolimits_{j=1}^{k} D(x_{ij}, \tilde{x}_{ij}) \qquad \text{EQ. 2}$$

where D is a distance function such as $|x-\tilde{x}|$ where $\tilde{x}$ is the reconstructed choice. The new representation $h_{ij}=g(Wx_{ij}+b)$ is transformed from raw inputs, $x_{ij}$. Then it can be used to reconstruct output, $\tilde{x}_{ij}=f(W^T h_{ij}+b')$. Weights W, biases b and b' are learned through back propagation. Compared to principle component analysis (PCA), autoencoders are more powerful and can learn non-linear representations because of the non-linear activation functions $f$ and g. In embodiments, two variants of autoencoders, namely, the ordinary AE and VAE are implemented. Because there is no ordinal relationship between different attribute categories and levels, the input x is given as a categorical variable. Each attribute is converted with a one-hot encoding, and can be concatenated as either a 1D or 2D vector (one attribute per row) before feeding to AE.

The architecture of the choice classification network 130 predicts user choices over two items. For example, given a pair of input items $(x_A, x_B)$, the networks of the autoencoder 120 without choice labels are first pretrained and then used the encoder to obtain the latent vector for choices A and B, denoted as $h_A$ and $h_B$ respectively. The embeddings for choices A and B are then concatenated and fed into a multi-layer neural architecture. The final output layer is the predicted utility score $\tilde{U}(x)=\phi(h_A, h_B)$. The training is optimized by minimizing the binary cross entropy between the target $\tilde{y}$ and predicted choice $\overline{Y}$. This architecture easily accommodates multiple options by extending the dimension of the input layer to take embeddings from more than two choices. The utility score is a numerical score that measures of how much each feature influences the customer's decision to select an alternative. The utility score represents a predicted value of a product defined by input data such as a combination of choices (e.g., one or more features and one or more choices of features).

After training, as discussed briefly above, the choice classification network 130 uses the trained $1^{st}$ NN 211 to generate high relevant feature-choice data to predict consumer choices for the interested products. The system 100 receives input feature data 117 and target data 127 of one or more interested products. The choice classification network 130 selects two or more choices as denoted choices and label the input feature data 117 in associated with the target data 127. The labelling step generates one labelled feature data for each denoted choices. The labelled input data are then fed into the trained $1^{st}$ NN 211 and generates outputs to be further fed into a second neural network ($2^{nd}$ NN) 213. The $2^{nd}$ NN 213 finally generates one or more predicted choices 219 for the products to be designed. Note that the interested products and the products to be designed are generally the same type of products, sharing similar features at different level but may be different in details, or the products to be designed may contain a combination of features that may not be available for the interested products.

Figure 3:
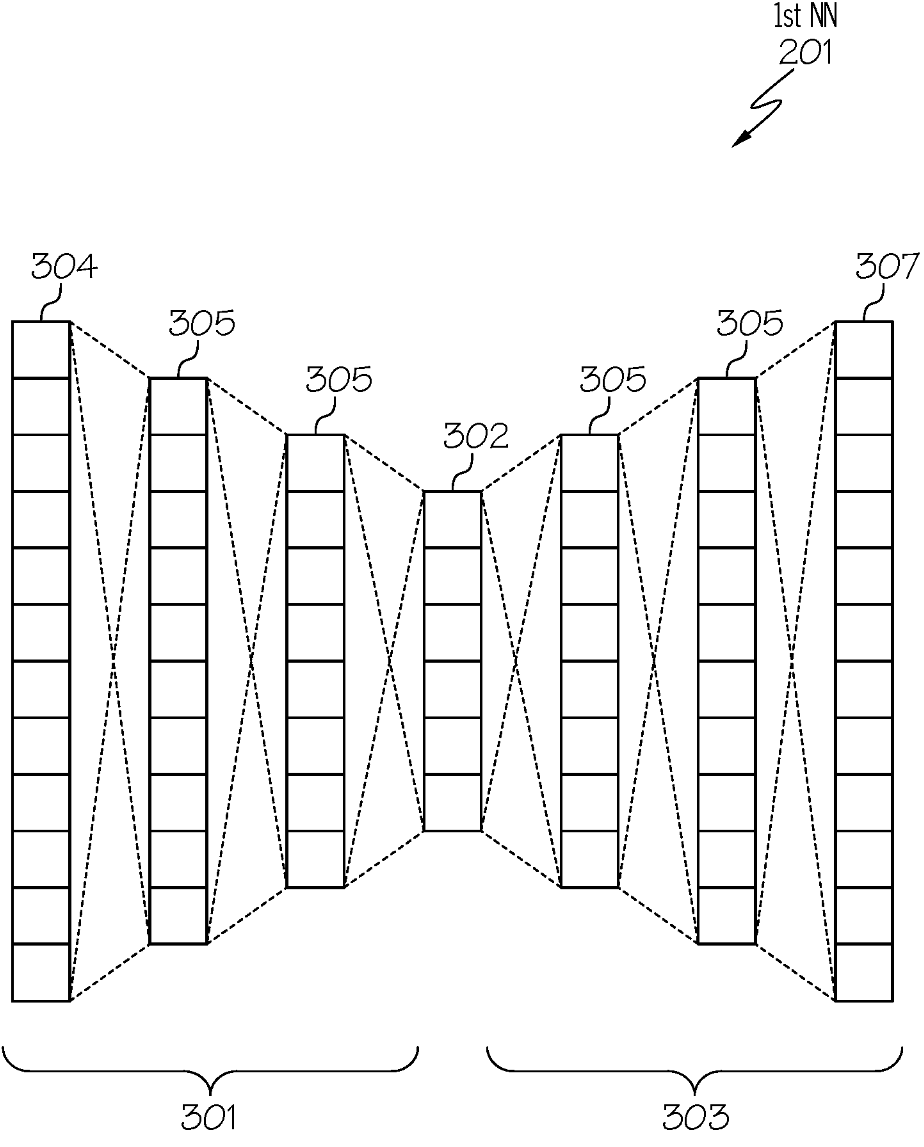
FIG. 3 schematically depicts an illustrative diagram of a first neural network of the autoencoder model, according to one or more embodiments shown and described herein.

Referring to FIG. 3, an example of the first neural network ($1^{st}$ NN) 201 of the autoencoder model 120 is depicted. The $1^{st}$ NN 210 may comprise three components, namely an encoder 301, a latent space 302, and a decoder 307. The encoder 301 compresses the input data, such as the training data 137 and/or input feature data 117 and target data 127, and produces a latent space 302, the decoder 303 then reconstructs the input data from the latent space 302. The encoder 301 and decoder 303 may have multiple layers. The encoder 301 has an input layer 304 and one or more of hidden layers 305. The decoder 303 has an output layer 307 and one or more of hidden layers 305. The input data, such as the training data 137, which contains the input features and input choices therein, are fed into the one or more input layers 304, and are encoded through multiple hidden layers 305. Through the layers of the encoder 301, each layer learns relevance of input features and selects input features based on the relevance to pass to the next layer such that the next layer retains the data of input features are more relevant to the input choices. By doing so, the most relevant data-latent representations are obtained and stored at the latent space 302. It is noted that the latent representation has a lower dimensionality than the input data, such as input features and input choices. In embodiments, the encoder 301 may learn linear relevance as well as nonlinear relevance.

Upon generating latent representations at the latent space 302, the $1^{st}$ NN 201 uses the latent representations to reconstruct the input data through the decoder 303. In embodiments, the decoder 303 mirrors the encoder 301, with the size of the input layers 304 matching that of the output layer 307. The autoencoder model 120 may train the 1$^{st}$ NN 201 using a loss function (e.g., Equation 1 discussed above) by conducting the following steps. First, the autoencoder model 120 generates representation h=(Wx+b) that is transformed from the input features x. For example, the new representation $h_{ij}=g(Wx_{ij}+b)$ is transformed from raw inputs $x_{ij}$, which is then used to reconstruct output $\tilde{x}_{ij}=f(W^T h_{ij}+b')$. That is, the autoencoder model 120 reconstructs output $x'=(W^T h+b')$, where W is weight, b is bias band, $W^T$ and b are transverse values of W and b and are learned through back propagation. In this operation, the autoencoder model 120 calculates, for each input, a distance between an input choice x and a reconstructed choice x', to yield a distance vector $|x-x'|$. The calculated vectors may be a high or a low level dimensional dataset, such as 1D, 2D, or nD vectors. The autoencoder model 120 minimizes the loss function which is a utility function as the sum of all distance vectors. The training process enables the autoencoder model 120 to learn non-linear representations because of the non-linear activation functions $f$ and g.

In embodiments, the autoencoder model 120 may impose restrictions to ensure efficiency and accuracy. For example, a training/test split ratio may be predetermined. Cycles of runs may be restricted below a given value, such as 100 epochs, for the efficiency in training and/or operation purposes. The accuracy of predicted output may be evaluated by satisfying a preset value. For example, an accuracy and area under the curve (AUC) value may be computed using an output score from a sigmoid activation function.

In embodiments, the 1$^{st}$ NN 201 may be trained by data of interested products as public benchmarks, historical inputs, or simulation data. The autoencoder model 120 may be further continuously updated and trained by input data. The as trained 1$^{st}$ NN 211 may be used in other models in this disclosure or may be used by itself to predict consumer choices.

Figure 4:
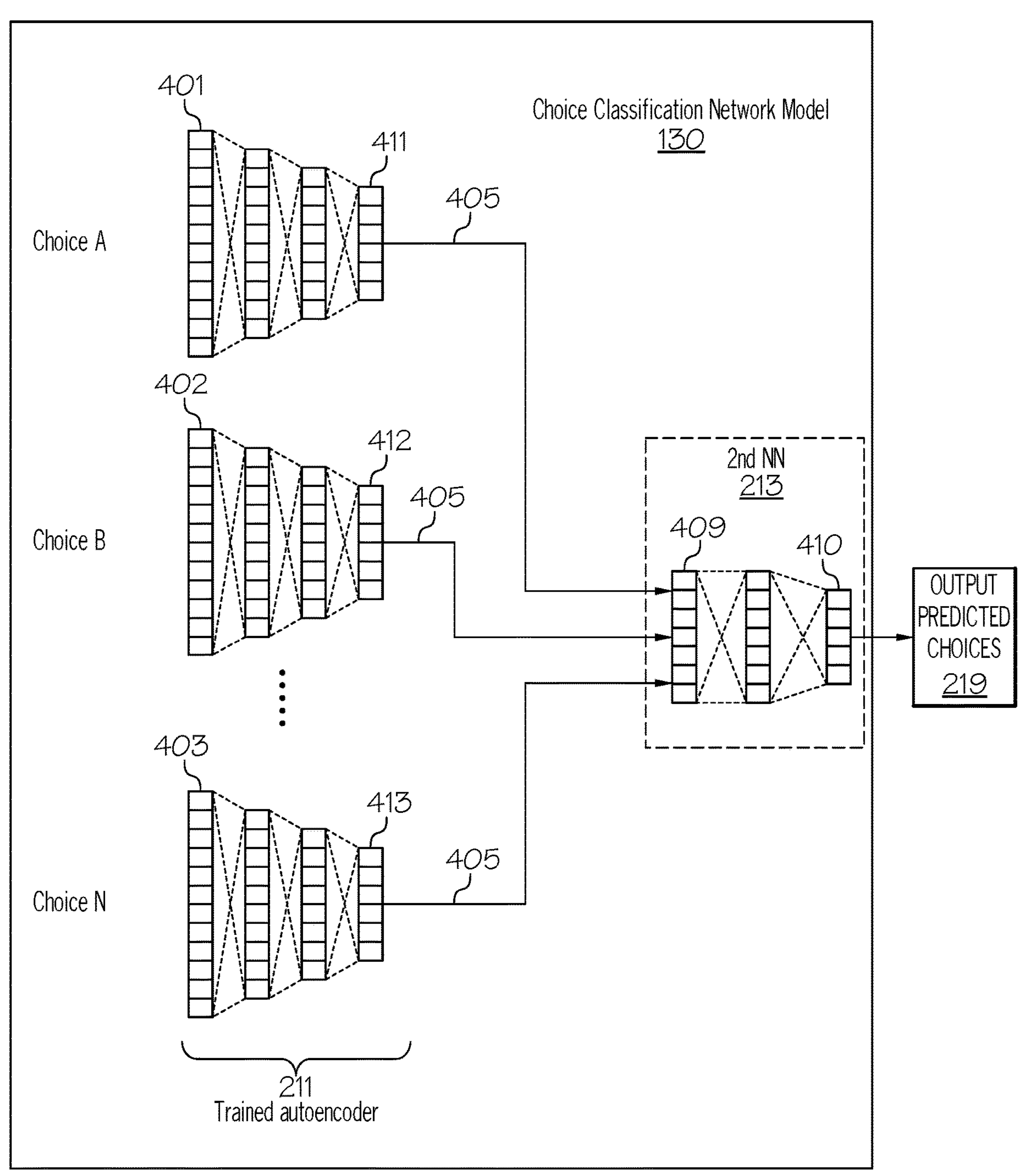
FIG. 4 schematically depicts an illustrative diagram of the choice classification network model, according to one or more embodiments shown and described herein.

Turning to FIG. 4, a more detailed representation of the choice classification network 130 is depicted. The choice classification network 130 may select two or more choices as denoted choices. To conduct the selection, the choice classification network 130 may refer to the high relevant input features contained in the latent representation in the trained 1$^{st}$ NN 211, and select the choices corresponding to the high relevant input features. The quantity of choices to be selected may be dependent on target data 127 based on the experience of the user, the industrial reasonable standard, or provided by the system 100.

Occasionally, a user may not select choices based on the latent representation of the trained 1$^{st}$ NN 211 because there is no relevance data available in the trained autoencoder. A user may select one or more preferred choices in additional to the choices selected based on the trained 1$^{st}$ NN 211. The choice classification network 130 may provide an initial target value for these choices and further train the 1$^{st}$ NN 201 during the process.

After the denoted choices are chosen, the choice classification network 130 labels input data, such as input feature data 117, with denoted choices. As illustrated in FIG. 4, multiple sets of input data are labelled with choices from A, B . . . to N. Each of the labelled input data set are fed into a trained 1$^{st}$ NN 211 at the input layer 304. For example, choice A label input data are fed at the input data layer 401, choice B label input data are fed at the input data layer 402, choice N label input data are fed at the input data layer 403, and so on. The choice classification network 130 encodes the labelled input data through the trained autoencoder and obtaining a latent vector for each denoted choice. Each of the labelled input data are encoded through the trained 1$^{st}$ NN 211 to arrive at a latent space (411, 412, and 413) of that denoted choice. For example, choice A label input data are encoded to generate a latent representation of choice A at the latent space of choice A 411, choice B label input data are encoded to generate a latent representation of choice B at the latent space of choice A 412, and choice N label input data are encoded to generate a latent representation of choice N at the latent space of choice N 413. Each of the latent representation of a denoted choice may be a high or low dimensional vector, such as 1D or 2D vector.

The choice classification network 130 transfers the latent representations of each denoted choices to embeddings of a lower dimensional vector, and concatenating the embeddings through concatenation 405. The concatenated embeddings are fed to the second neural network (2$^{nd}$ NN) 213 at its final representation layer 409 as an input layer. The 2$^{nd}$ NN 213 is a multilayer neural network with a last layer as a final output layer 410. The final output layer 410 may include a calculated utility score U(x) for each choice. The choice classification network 130 generates and outputs a predicted choice 219, for each denoted choice, based on the predicted utility scores. The choice classification network 130 may train the second neural network 213 by minimizing a binary cross entropy as a function of the predicted choices 219 and corresponding targets. After training the second neural network 213, the choice classification network 130 utilizes the second neural network 213 to output the predicted choices 219, which have the highest utility scores U(x).

In embodiment, the choice classification network 130 may use a different pre-trained autoencoder instead of the trained 1$^{st}$ NN 211 of the autoencoder model 120. Such pre-trained autoencoder may have a learned representation in a latent space. The pre-trained autoencoder may include a neural network comprising an encoder, a decoder, and the latent space that is a bottleneck between the encoder and the decoder. The pre-trained autoencoder may contain in the learned representation one or more choices that shows relevance to the input features 117. A user may select any of the choices in the learned representation as denoted choices for the labelling purpose as mentioned above.

Figure 5:
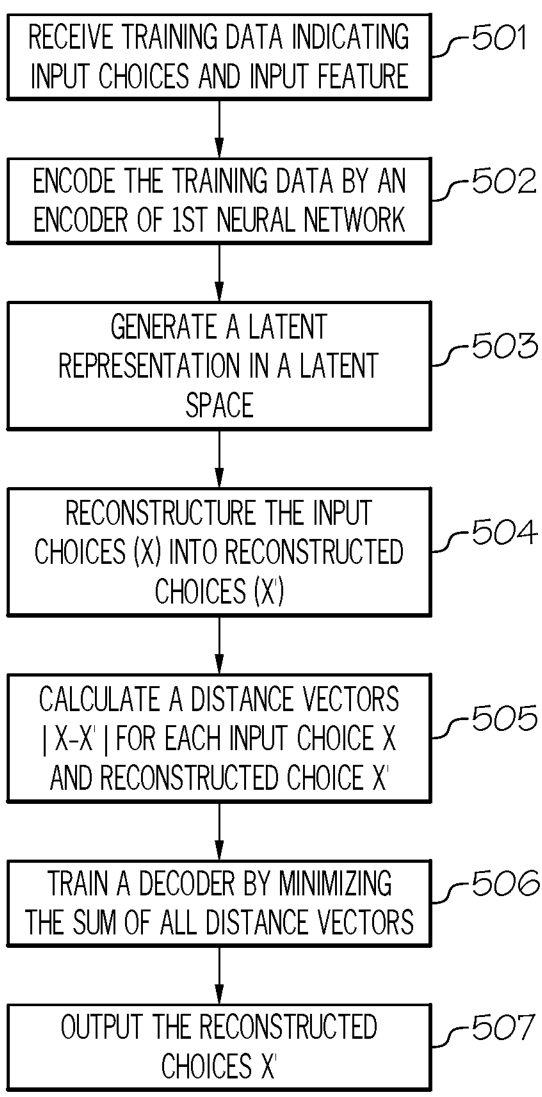
FIG. 5 schematically depicts a flow chart of an illustrative method for training the autoencoder model, according to one or more embodiments shown and described herein.

FIG. 5 illustrates a flow chart of an example method for training the autoencoder model 120. At block 501, the system 100 receives training data 137 comprising input choices and input features and fed the training data 137 to the input layer 304 of the encoder 301. At block 502, the autoencoder model 120 encodes the training data by the encoder 301 of the first neural network 201. At block 503 the autoencoder model 120 generates a latent representation in a latent space 302. At block 504, the autoencoder model 120 reconstructs the input choice (x) into reconstructed choices (x') based on an activation function. At block 505, the autoencoder model 120 calculates a distance vectors $|x-x'|$ for each input choice x and reconstructed choice x'. At block 506, the autoencoder model 120 trains the decoder 303 by minimizing a loss function, wherein the loss function is the sum of all distance vectors. At block 507, the autoencoder model 120 may output the reconstructed choices x' in the output layer 307.

Figure 6:
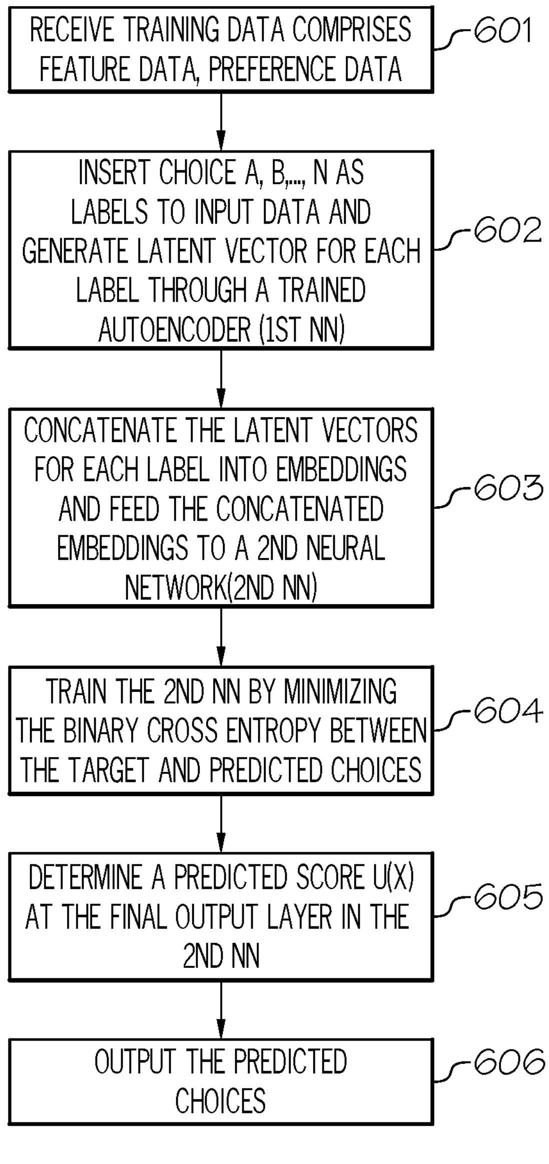
FIG. 6 schematically depicts a flow chart of an illustrative method for generating predicted preferences with the choice classification network model, according to one or more embodiments shown and described herein.

FIG. 6 illustrate a flow chart of an example method for generating predicted choices 219 (e.g., one or more predicted preferences) with the choice classification network 130 implementing the ConjointNet architecture described herein. At block 601, the system 100 receives input data comprising input feature data 117 and target data 127. At block 602, the choice classification network 130 ingests choice A, B . . . N as labels to input data and generates latent vector for each label choice through the trained 1st NN 211. At block 603, the choice classification network 130 concatenates the latent vectors for each choice into embeddings and feed the concatenated embeddings to the 2nd NN 213. At block 604, the choice classification network 130 may, if not already trained, train the 2nd NN 213 by minimizing the binary cross entropy between the targets and predicted choices 219. At block 605, the choice classification network 130 determines a predicted score U(x) at the final output layer 410 in the 2nd NN 213. At block 606, the choice classification network 130 outputs the predicted choices 219.

Figure 7:
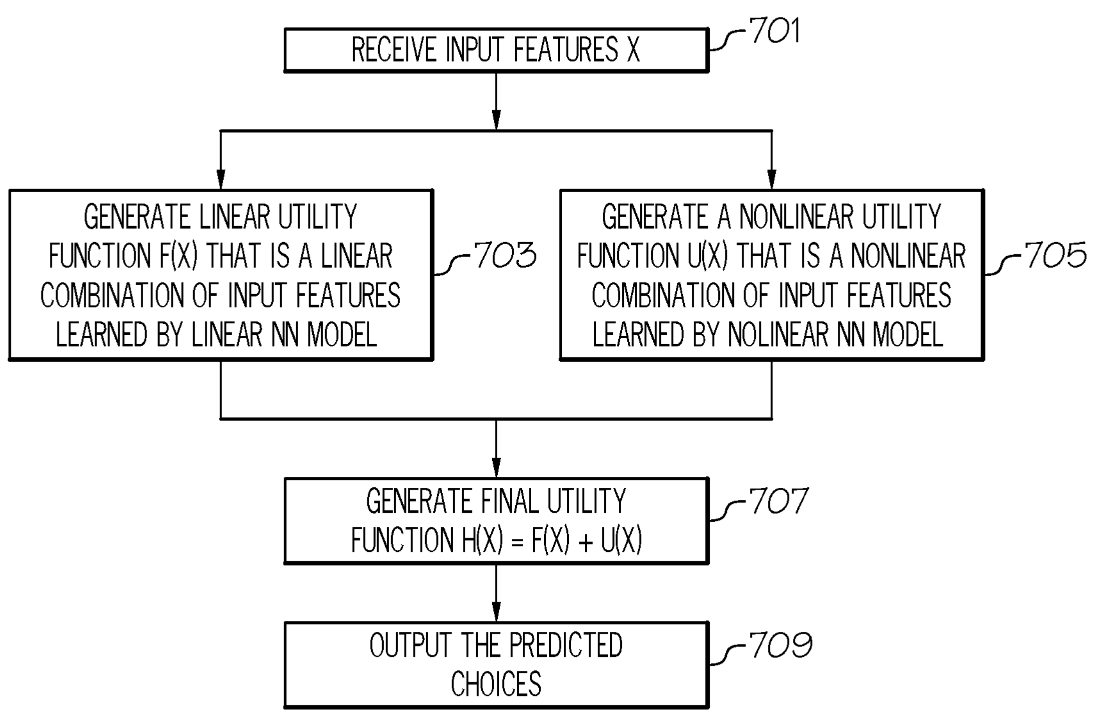
FIG. 7 schematically depicts a flow chart of an illustrative method for generating predicted choices using the residual ConjointNet model, according to one or more embodiments shown and described herein.
Figure 8:
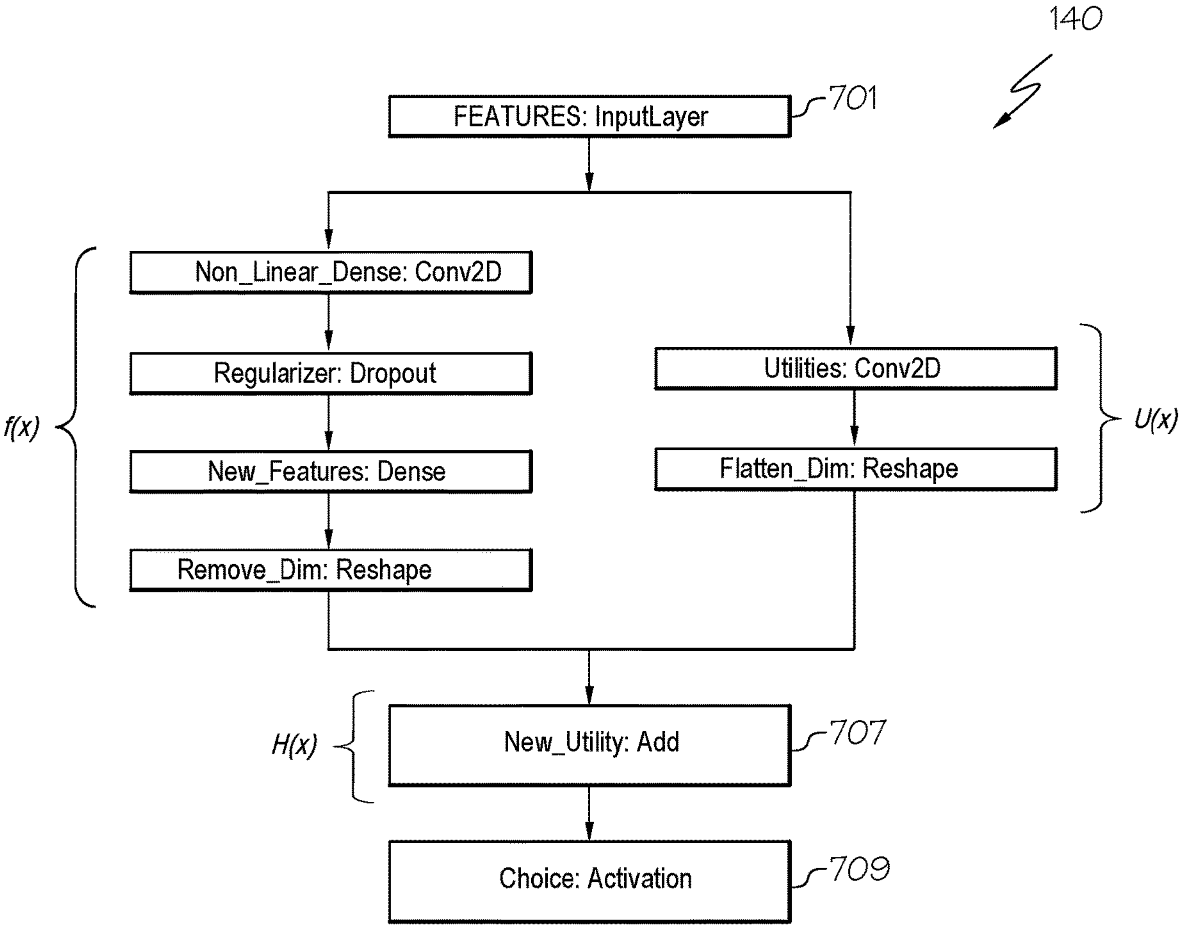
FIG. 8 depicts a block diagram of an illustrative architecture of the ConjointNet implemented utilizing the neural network architecture of a Residual Network, according to one or more embodiments shown and described herein.

In some embodiments, the ConjointNet may be implemented utilizing the neural network architecture of a Residual Network (ResNet). Referring to FIGS. 7 and 8, the ConjointNet implemented utilizing the neural network architecture of a Residual Network (ResNet) is depicted and described. FIG. 7 depicts a flowchart of an example of generating predicted choices 219 using the residual ConjointNet Model 140. FIG. 8 depicts a block diagram of an illustrative architecture of the ConjointNet implemented utilizing the neural network architecture of a Residual Network (ResNet). The core idea of ResNet is in the introduction of the 'identity shortcut', called a residual block, to approximate a residual function. The input x is passed directly to the output of the residual block. In the ConjointNet analysis, the system is not directed to learning the residual functions with the original input x, rather the residual functions with the utility U(x). For example, assuming H(x) represents the underlying mapping function from input x, a problem of learning the non-linear feature interactions is formulated as follows:

$$H(x) = U(x) + f(x) \quad \text{EQ. 3}$$

where U(x) is defined as in EQ. 1. As shown in FIG. 8, the architecture consists of one hidden fully connected layer NonLinearDense to learn the non-linear interactions $f(x)$ which connects to the input layer. The final utility function obtained by adding the utilities extracted from new non-linear features $f(x)$ to utilities obtained from the original input features U(x).

Referring to FIG. 7, at block 701, the consumer choice prediction system 100 receives input data comprising input feature data 117. At block 703, the residual ConjointNet Model 140 encodes the input features 117 through a linear utility neural network with a linear utility function $f(x)$ that is a linear combination of input features 117 learned by linear NN model. At block 705, the residual ConjointNet Model 140 encodes the input features 117 through a non-linear utility neural network with a nonlinear utility function U(x) that is a non-linear combination of input features 117 learned by nonlinear NN model. At block 707, the residual ConjointNet Model 140 combines the linear and nonlinear features in the final utility function $H(x)=f(x)+U(x)$ and use an activation function to optimize the final utility function. At block 709, the residual ConjointNet Model 140 outputs the predicted choices 219.

It should be understood that steps of the aforementioned process may be omitted or performed in a variety of orders while still achieving the object of the present disclosure. The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

To show that the ConjointNet architecture is not only suitable for data that were not designed explicitly for conjoint analysis, such as Moral Machine (MM) but that the ConjointNet architecture outperforms conventional methods, the following experiments and results are presented. As shown through the below results, it is demonstrated that the ConjointNet architecture described herein has improved efficacy when addressing more realistic settings. Experiments were conducted where the ConjointNet was evaluated on two public benchmarks, the Moral Machine (MM) [Awad et al. The moral machine experiment. *Nature,* 563(7729): 59-64, November 2018.] and Car Preference [Abbasnejad et al., Learning community-based preferences via dirichlet process mixtures of Gaussian processes. In *Proceedings of the Twenty-Third International Joint Conference on Artificial Intelligence*, IJCAI '13, pages 1213-1219. AAAI Press, August 2013.], which were analyzed using the traditional conjoint model. One of the major differences between these two datasets is that the Moral Machine experiment did not follow a fully randomized design, which is generally required in applying conjoint analysis.

A. Data Preprocessing

1. The Moral Machine (MM) Dataset

The MMdata is collected from a crowdsourced study that asks human subjects about moral dilemmas using an autonomous vehicles in a variation of the Trolley Problem. Subjects are presented with dilemmas in which they need to direct a self-driving car to either the left or the right side of a road. Only the pedestrian versus pedestrian dilemmas was sampled from the MM dataset, where PedPed equals to '1'. Dilemmas with an empty UserID and only one respondent choice are removed from the data. To reconstruct the pairwise comparison for one dilemma presented to the user, the dataset was split into two sets where intervention occurs (suffix=int) or not (suffix=noint). The scenario fields which vary within pairs of responses are concatenated into one vector on index ResponseID.

The input features included 42 input variables including 20 for agents on the intervention side, 20 for agents on the no intervention side, CrossingSignal and LeftHand which are symmetrical on both sides. All variables were converted to numeric types including categorical variables CrossingSignal∈{0,1,2} and LeftHand∈{0,1}. An alternative would be to use one-hot encoding to represent the categorical variables, which will increase the input dimensions.

The target data included two choices for each scenario, which created the target variable Intervened using the Saved_int column, represented as $Y \in \{0,1\}$, where Y=1 indicates a choice to intervene (swerve) that leads to one set of characters being saved over the other.

2. Car Preference Dataset

The Car Preference Dataset is a dataset collected through two experiments (with 10 and 20 cars) set up in Amazon Mechanical Turk to collect pair-wise preferences. In both experiments, users were presented with a choice between two cars with different attributes. The data include input user attributes (Education, Age, Gender, Region), car attributes (Body type, Transmission, Engine capacity, Fuel consumed, Engine/Transmission layout only presented in the second experiment) and the binary target response indicating users' preferences over items. The first experiment collected data from 60 users with choices over all 45 possible configurations of attributes for 10 cars. The second experiment included 20 cars and subsets of 38 attribute combinations for each user.

B. Evaluation Metrics

Experiments were performed to evaluate the performance of the different models on two public benchmarks. All train/test split ratios are roughly 70/30. For the experiments, all models converged in less than 100 epochs. The model used for testing is the one with best validation accuracy during training. The results are reported with two commonly used metrics for evaluating binary decisions: accuracy and area under the curve (AUC). The AUC value is computed using the output score from the sigmoid activation function in the last layer. The accuracy is the average of the number of correct predictions over ground truth.

C. Results

The baseline conjoint model is a linear model defined in $$U(x) = \sum_{i=1}^{m} \sum_{j=1}^{k_i} y_{ij} x_{ij}$$

without the inclusion of additional hand-engineered interaction features. Conjoint usually is applied to estimate the impact of each attribute rather than predicting human decisions. It is noted that the baseline performance is low compared to other classification problems such as object recognition. This is partly due to the fact that predicting human choices is inherently challenging as human decision process is noisy and complex. For example, completely different decisions can be made with the same scenario under different circumstances.

1. Performance on the MM Dataset

| Model type | Accuracy | AUC |
| --- | --- | --- |
| Conjoint | 0.719 | 0.779 |
| ConjointNet | 0.789 | 0.850 |

Table 1, shown above, provides a comparison of the results for traditional conjoint analysis and the ConjointNet architecture with semi-supervised learning, described herein, performing on the MM dataset.

The performance of the ConjointNet architecture on the MM dataset had better accuracy and AUC compared to traditional conjoint analysis when evaluated. When using autoencoders, questions to ask are whether decoding input data through the latent representations can obtain successful reconstruction, and the number of nodes required at the bottleneck layer. Two types of autoencoders, namely VAE and a plain autoencoder were implemented. The architecture of the encoder network consists of two fully connected layers, 276-dimensional input layer followed by a 128-dimensional hidden layer with batch normalizations and ReLU activations that project the input to a 2-dimensional latent space. The decoder network comprises two fully connected layers, 128-dimensional hidden layer that decode the projected 2-dimensional vectors, followed by a 276-dimensional output layer.

The reconstruction results of an unseen sample from the MM dataset with a VAE and a plain AE both delivered successful reconstruction with a 2-D latent space with the AE providing slightly better reconstruction compared to VAE on unseen data. This shows that the autoencoders generated representations that capture the input distribution in a reduced dimension, thus removing noise.

After the autoencoder is trained on raw input data without supervision, the second stage includes training the choice classification network with human decision responses. The trained encoder (e.g., the trained $1^{st}$ NN 211 of the choice classification network 130 depicted in FIG. 2) is connected to a two-layered fully connected classification network (e.g., the $2^{nd}$ NN 213 of the choice classification network 130 depicted in FIG. 2). The network can be trained in two ways: by freezing the encoder and only update the weights of the classification network or fine-tune the encoder while the classification network is optimized. Table 1, provided above, reports the choice prediction performance with the ConjointNet architecture compared to the baseline conjoint analysis method on the MM dataset. The ConjointNet architecture outperforms the baseline conjoint analysis by 7% in both classification accuracy and AUC value.

2. Performance on the Car Preference

Analysis of the performance of residual ConjointNet model 140 on the car preference dataset was evaluated and Table 2 presented below provides a comparison of the accuracy and AUC results between the baseline Conjoint and the residual ConjointNet model 140.

| Model Type | Accuracy | AUC |
| --- | --- | --- |
| Conjoint | 0.618 | 0.659 |
| ConjointNet | 0.688 | 0.661 |

Table 2 shows that the residual ConjointNet architecture improves the prediction accuracy by 7% compared to traditional conjoint analysis. Additionally, the residual ConjointNet architecture achieves similar AUC values as conjoint but boasts a much higher prediction accuracy.

Figure 9:
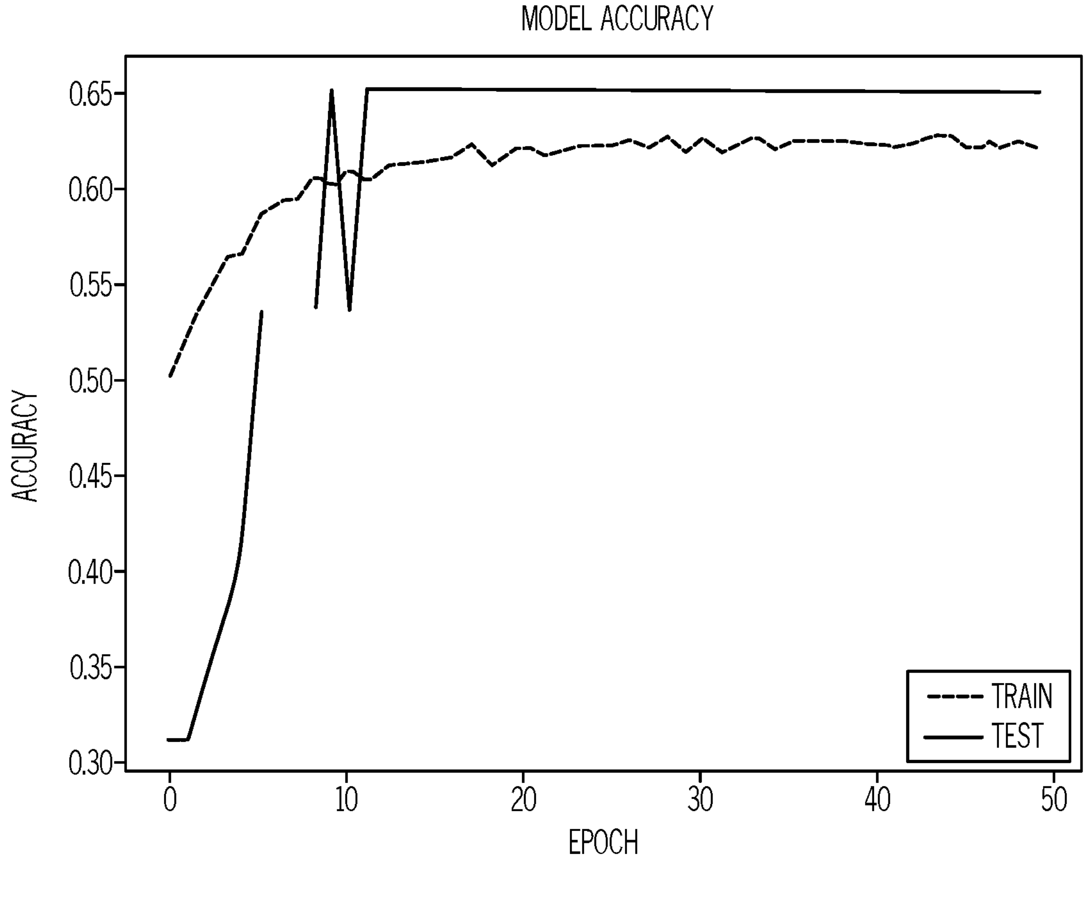
FIG. 9 depicts sample training and testing accuracy on the car preference dataset with 16 hidden nodes.
Figure 10:
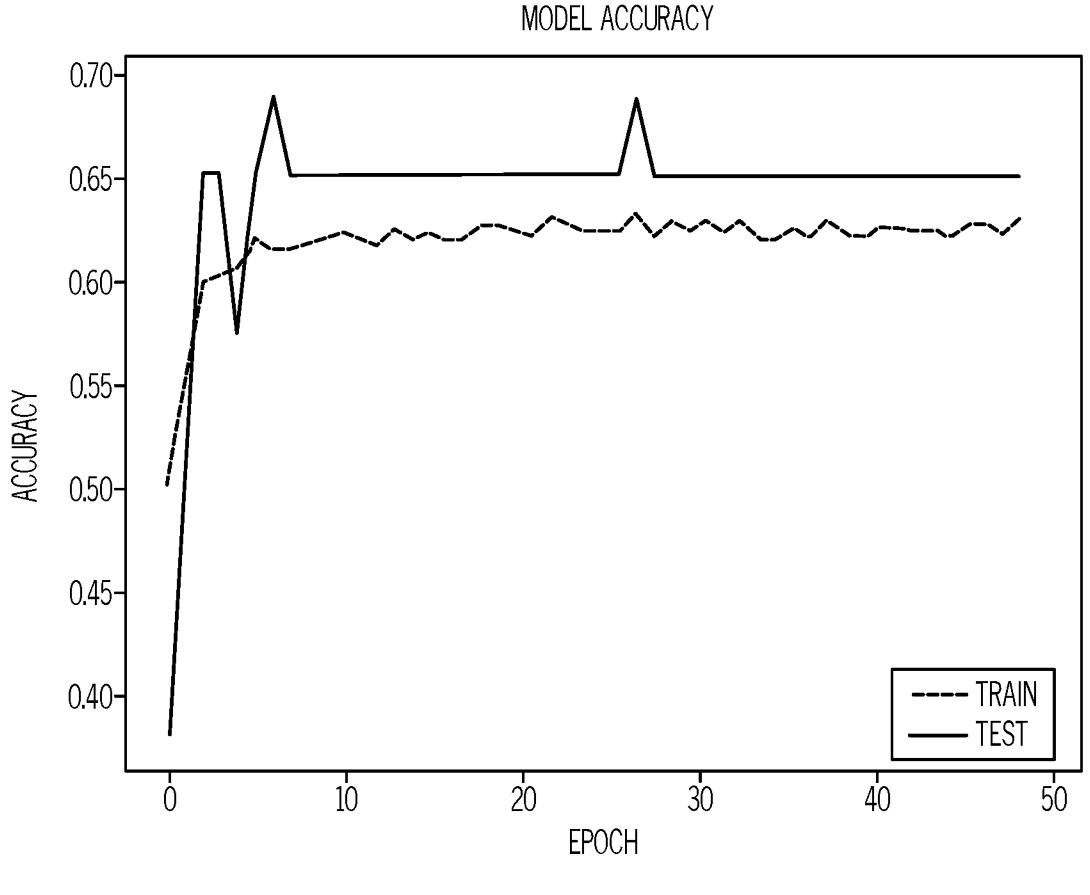
FIG. 10 depicts sample training and testing accuracy on the car preference dataset with 64 hidden nodes.

FIG. 9 and FIG. 10 illustrate the choice prediction results with 16 and 64 nodes in the hidden layer. As the number of nodes increases, the network has larger capacity, which leads to performance increasing by over 2% in both training and testing accuracies. The improvement in training accuracy indicates that an increase in model capacity allows the ConjointNet architecture to extract representative features from the car preference data that are not possible with linear models. The increase in the testing accuracy with a higher number of nodes shows that the ConjointNet architecture did not overfit the training dataset. The complexity of the car preference data benefits from the ConjointNet architecture compared to traditional simple linear models.

Embodiments of the ConjointNet architecture, which are described herein include two novel neural network architectures to predict user preferences. ConjointNet architecture leverages representation learning to overcome the limitations of linear assumptions in traditional conjoint analysis. The ConjointNet architecture outperforms conjoint in predicting user preferences on two public datasets. In particular, it was observed that the ConjointNet architecture is not only suitable for data that were not designed explicitly for conjoint analysis (MM) but also outperforms conventional methods For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method for generating predicted preferences, the method comprising:

implementing, with a computing device having a processor and a non-transitory computer-readable memory, a conjoint architecture comprising:

an autoencoder trained to transform input data including one or more choices and one or more features into one or more choice latent representations in a latent space, wherein:

each choice latent representation is extracted by feeding, for each choice, a corresponding group of labeled features labeled by the choice such that a number of choice latent representations is equal to a number of choices, and the autoencoder is trained based on sample features and target data associated with the sample features to generate learned latent representations in the latent space, each target data includes two sample choices, and a choice classification network including a neural network sequentially connected to the latent space of the autoencoder, the neural network trained to predict one or more predicted preferences from the one or more choice latent representations, wherein the one or more predicted preferences are one or more of the choices; and outputting, from the choice classification network, the one or more predicted preferences.

2. The method of claim 1, wherein the choice classification network comprises a multilayer neural network, where the multilayer neural network learns linear and nonlinear relevance between the one or more choices and the one or more features.

3. The method of claim 1, wherein an activation function of the autoencoder is nonlinear.

4. The method of claim 1, wherein the one or more predicted preferences comprise vehicle options defining a combination of two or more of a brand, a size, a color, a powertrain, or a price range.

5. The method of claim 1, wherein the input data is converted to a 1-dimensional or 2-dimensional vector using one-hot encoding before feeding into the autoencoder.

6. The method of claim 1, wherein:

the latent representation defines a latent vector for each of the input data, the choice classification network comprises a multilayer neural network architecture, each latent vector is concatenated into a concatenated latent vector and the concatenated latent vector is fed into the multilayer neural network architecture, and the choice classification network generates, from the concatenated latent vector, a predicted utility score, the predicted utility score representing a predicted value of a product defined by the input data.

7. The method of claim 1, wherein the neural network of the choice classification is trained based on the learned representations in the latent space.

8. A system for generating predicted preferences, the system comprising:

one or more processors; and a non-transitory, computer-readable medium storing instructions that, when executed by the one or more processors, cause the one or more processors to:

implement a conjoint architecture comprising:

an autoencoder trained to transform input data including one or more choices and one or more features into one or more choice latent representations in a latent space, wherein:

each choice latent representation is extracted by feeding, for each choice, a corresponding group of labeled features labeled by the choice such that a number of choice latent representations is equal to a number of choices, and the autoencoder is trained based on sample features and target data associated with the sample features to generate learned latent representations in the latent space, each target data includes two sample choices, and a choice classification network including a neural network sequentially connected to the latent space of the autoencoder, the neural network trained to predict one or more predicted preferences from the one or more choice latent representations, wherein the one or more predicted preferences are one or more of the choices; and output, from the choice classification network, the one or more predicted preferences.

9. The system of claim 8, wherein the choice classification network comprises a multilayer neural network, where the multilayer neural network learns linear and nonlinear relevance between the one or more choices and the one or more features.

10. The system of claim 8, wherein an activation function of the autoencoder is nonlinear.

11. The system of claim 8, wherein an activation function of the autoencoder is defined as $$L_{recon} = \min \sum_{i=1}^{m} \sum_{j=1}^{k} D(x_{ij}, \tilde{x}_{ij}),$$

where D is a distance function.

12. The system of claim 8, wherein the one or more predicted preferences comprise vehicle options defining a combination of two or more of a brand, a size, a color, a powertrain, or a price range.

13. The system of claim 8, wherein the input data is converted to a 1-dimensional or 2-dimensional vector using one-hot encoding before feeding into the autoencoder.

14. The system of claim 8, wherein:

the latent representation defines a latent vector for each of the input data, the choice classification network comprises a multilayer neural network architecture, each latent vector is concatenated into a concatenated latent vector and the concatenated latent vector is fed into the multilayer neural network architecture, and the choice classification network generates, from the concatenated latent vector, a predicted utility score, the predicted utility score representing a predicted value of a product defined by the input data.

15. A computing program product for generating predicted preferences, the computing program product comprising machine-readable instructions stored on a non-transitory computer readable memory, which when executed by a computing device, causes the computing device to carry out steps comprising:

implementing a conjoint architecture comprising:

an autoencoder trained to transform input data including one or more choices and one or more features into one or more choice latent representations in a latent space, wherein:

each choice latent representation is extracted by feeding, for each choice, a corresponding group of labeled features labeled by the choice such that a number of choice latent representations is equal to a number of choices, and the autoencoder is trained based on sample features and target data associated with the sample features to generate learned latent representations in the latent space, each target data includes two sample choices, and a choice classification network including a neural network sequentially connected to the latent space of the autoencoder, the neural network trained to predict one or more predicted preferences from the one or more choice latent representations, wherein the one or more predicted preferences are one or more of the choices; and outputting, from the choice classification network, the one or more predicted preferences.

16. The computing program product of claim 15, wherein the choice classification network comprises a multilayer neural network, where the multilayer neural network learns linear and nonlinear relevance between the one or more choices and the one or more features.

17. The computing program product of claim 15, wherein an activation function of the autoencoder is nonlinear.

18. The computing program product of claim 15, wherein an activation function of the autoencoder is defined as $$L_{recon} = \min \sum_{i=1}^{m} \sum_{j=1}^{k} D(x_{ij}, \tilde{x}_{ij}),$$

where D is a distance function.

19. The computing program product of claim 15, wherein the input data is converted to a 1-dimensional or 2-dimensional vector using one-hot encoding before feeding into the autoencoder.

20. The computing program product of claim 15, wherein:

the latent representation defines a latent vector for each of the input data, the choice classification network comprises a multilayer neural network architecture, each latent vector is concatenated into a concatenated latent vector and the concatenated latent vector is fed into the multilayer neural network architecture, and the choice classification network generates, from the concatenated latent vector, a predicted utility score, the predicted utility score representing a predicted value of a product defined by the input data.

* * * * *